United States Patent
Shwed

[19]

[11] Patent Number: 5,606,668
[45] Date of Patent: Feb. 25, 1997

[54] SYSTEM FOR SECURING INBOUND AND OUTBOUND DATA PACKET FLOW IN A COMPUTER NETWORK

[75] Inventor: Gil Shwed, Jerusalem, Israel

[73] Assignee: Checkpoint Software Technologies Ltd., Jerusalem, Israel

[21] Appl. No.: 168,041

[22] Filed: Dec. 15, 1993

[51] Int. Cl.$^6$ ............ G06F 13/36; G06F 15/401
[52] U.S. Cl. .................. 395/200.11; 395/200.1; 395/836; 395/186; 395/187.01; 380/42
[58] Field of Search .................. 395/200.01, 200.1, 395/200.11, 835, 836, 186, 726, 187.01; 380/42

[56] References Cited

U.S. PATENT DOCUMENTS

| | | | |
|---|---|---|---|
| 4,315,315 | 2/1982 | Kossiakoff | 364/300 |
| 4,736,320 | 4/1988 | Bristol | 364/300 |
| 5,247,693 | 9/1993 | Bristol | 395/800 |

OTHER PUBLICATIONS

"A Software Design and Implementation for Filtering, Forwarding and Ciphering in a Secure Bridge", Soriano et al, IEEE, 1992, pp. 487–492.

"A Network Firewall", Marcus J. Ranum, Digital Equipment Corporation.

"Network (In) Security Through IP Packet Filtering", D. Brent Chapman, Proceedings of the Third UNSENIX UNIX Security Symposium; Baltimore, MD, Sep. 1992.

"The TAMU Security Package: An Ongoing Response to Internet Intruders in an Academic Environment", David R. Safford, Douglas Lee Schales, David K. Hess, UNIX Security Symposium IV, Oct. 4–6, 1993.

"The Design of a Secure Internet Gateway", Bill Cheswick, AT&T Bell Laboratories, Jun. 1990.

"An Internet Gatekeeper", Herve Schauer, Christophe Wolfhugel, Herve Schauer Consultants.

*Primary Examiner*—Thomas C. Lee
*Assistant Examiner*—Rehana Perveen Krick
*Attorney, Agent, or Firm*—Ladas & Parry

[57] ABSTRACT

A filter module allows controlling network security by specifying security rules for traffic in the network and accepting or dropping communication packets according to these security rules. A set of security rules are defined in a high level form and are translated into a packet filter code. The packet filter code is loaded into packet filter modules located in strategic points in the network. Each packet transmitted or received at these locations is inspected by performing the instructions in the packet filter code. The result of the packet filter code operation decides whether to accept (pass) or reject (drop) the packet, disallowing the communication attempt.

12 Claims, 18 Drawing Sheets

FIRE WALL-1 RULE BASE EDITOR: CORPORATE

FILE  RULE  FILTER  ROUTERS  UTILITIES  PROPERTIES...  TUTORIAL

WINDOWS: NETWORK OBJECTS  SERVICES  SYSTEM VIEW  LOG VIEWER

| NO. | SOURCE | DESTINATION | SERVICES | ACTION | TRACK | INSTALL ON |
|---|---|---|---|---|---|---|
| 1 | ANY | MAIL SERVERS | TCP SMTP | ACCEPT | | GW GATEWAYS |
| 2 | CEO, CFO | FINANCE | ANY | STOP DROP | ALERT | GW GATEWAYS |
| 3 | TRUSTED PARTIES | INTERNAL | RPC RSTAT, TALK, TCP TELNET | ACCEPT | | DST |
| 4 | INTERNAL | ANY | ANY | ACCEPT | ALERT | GW GATEWAYS |
| 5 | ANY | INTERNAL, FINANCE | ANY | REJECT | MAIL | DST |

RULE BASE SAVED TO '/FW/USERS/MARIUS/CORPORATE.W'    COPYRIGHT ©1993 CHECKPOINT SOFTWARE TECHNOLOGIES LTD.

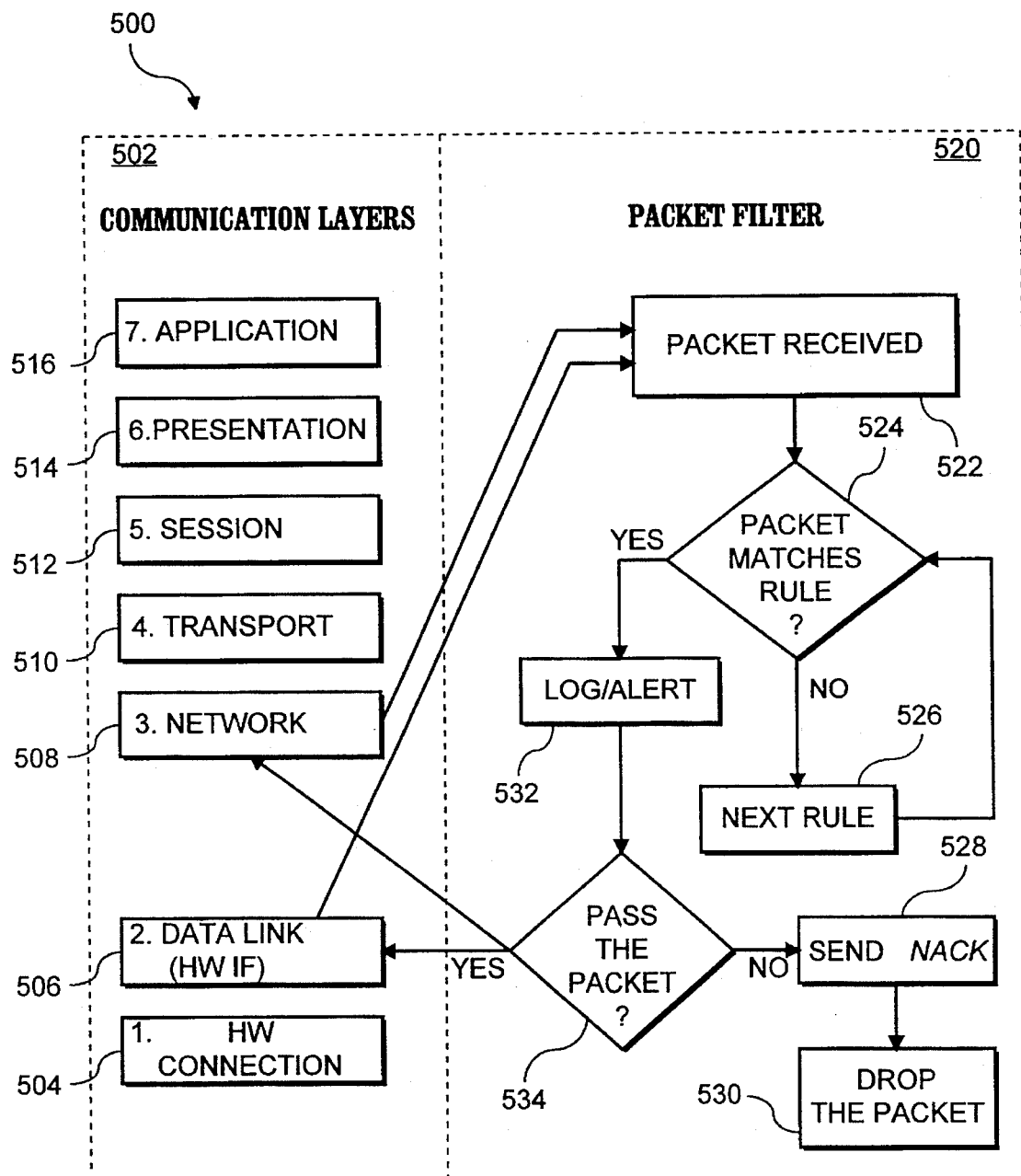
F I G. 5

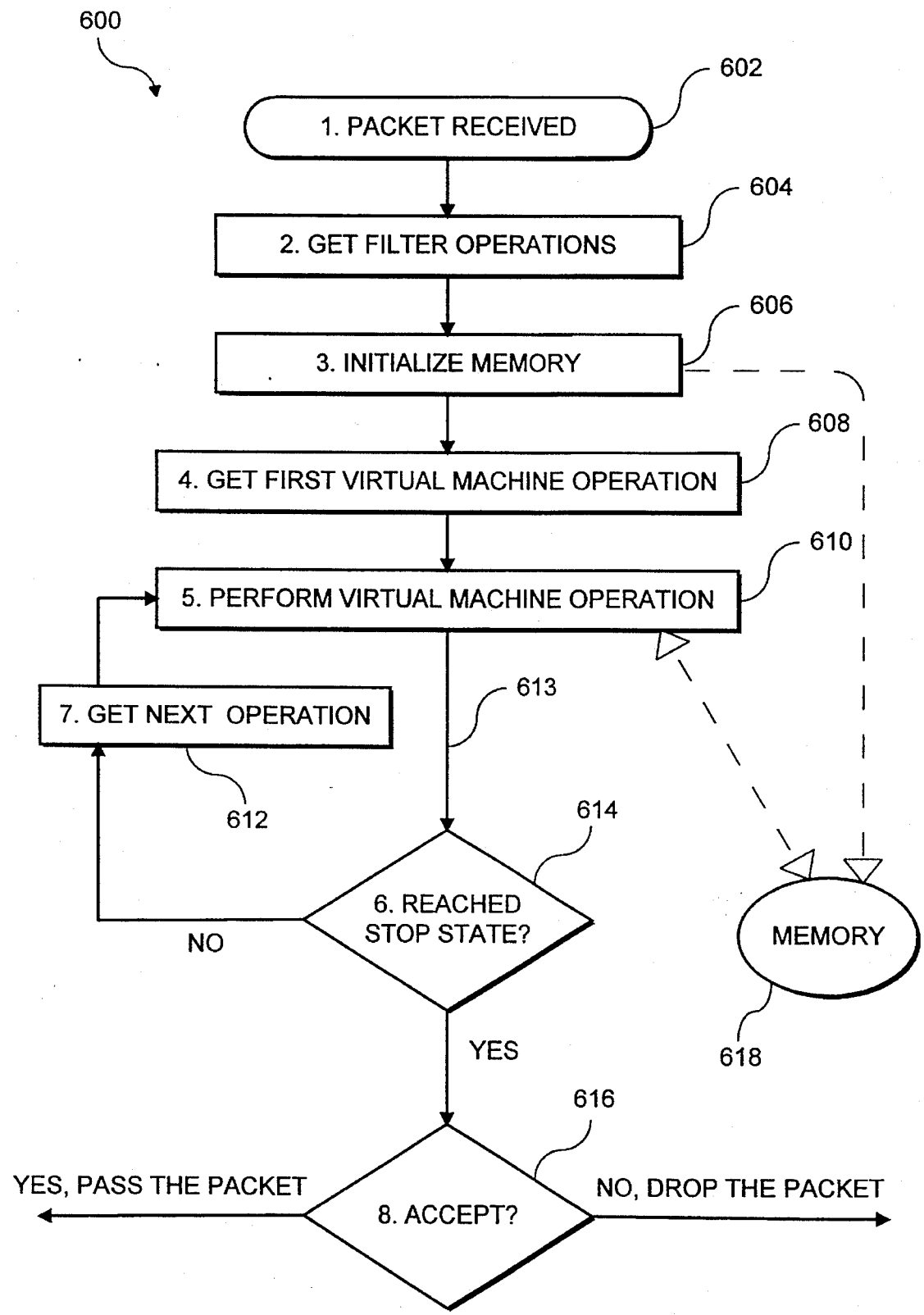
F I G. 6

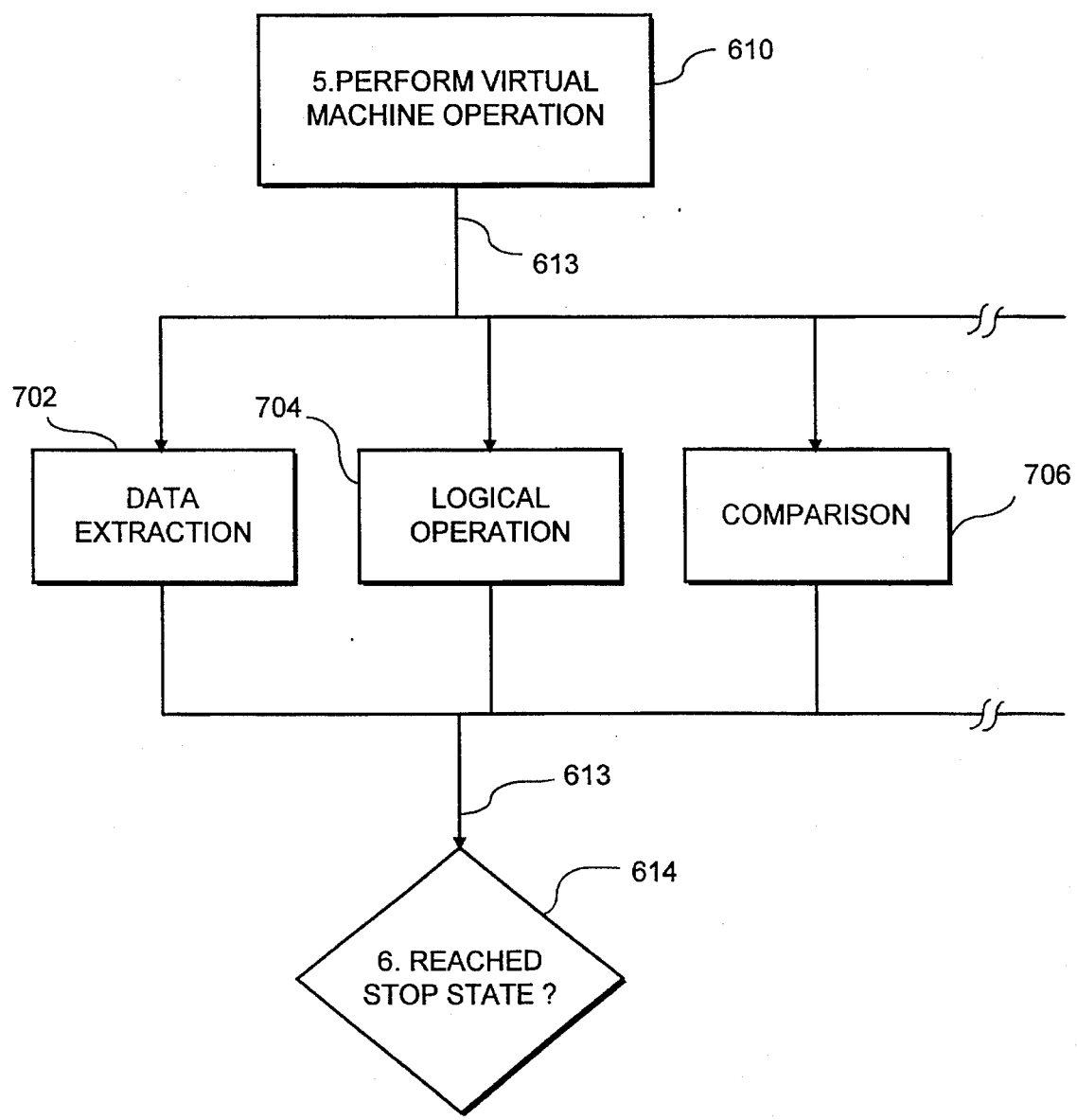
F I G. 7

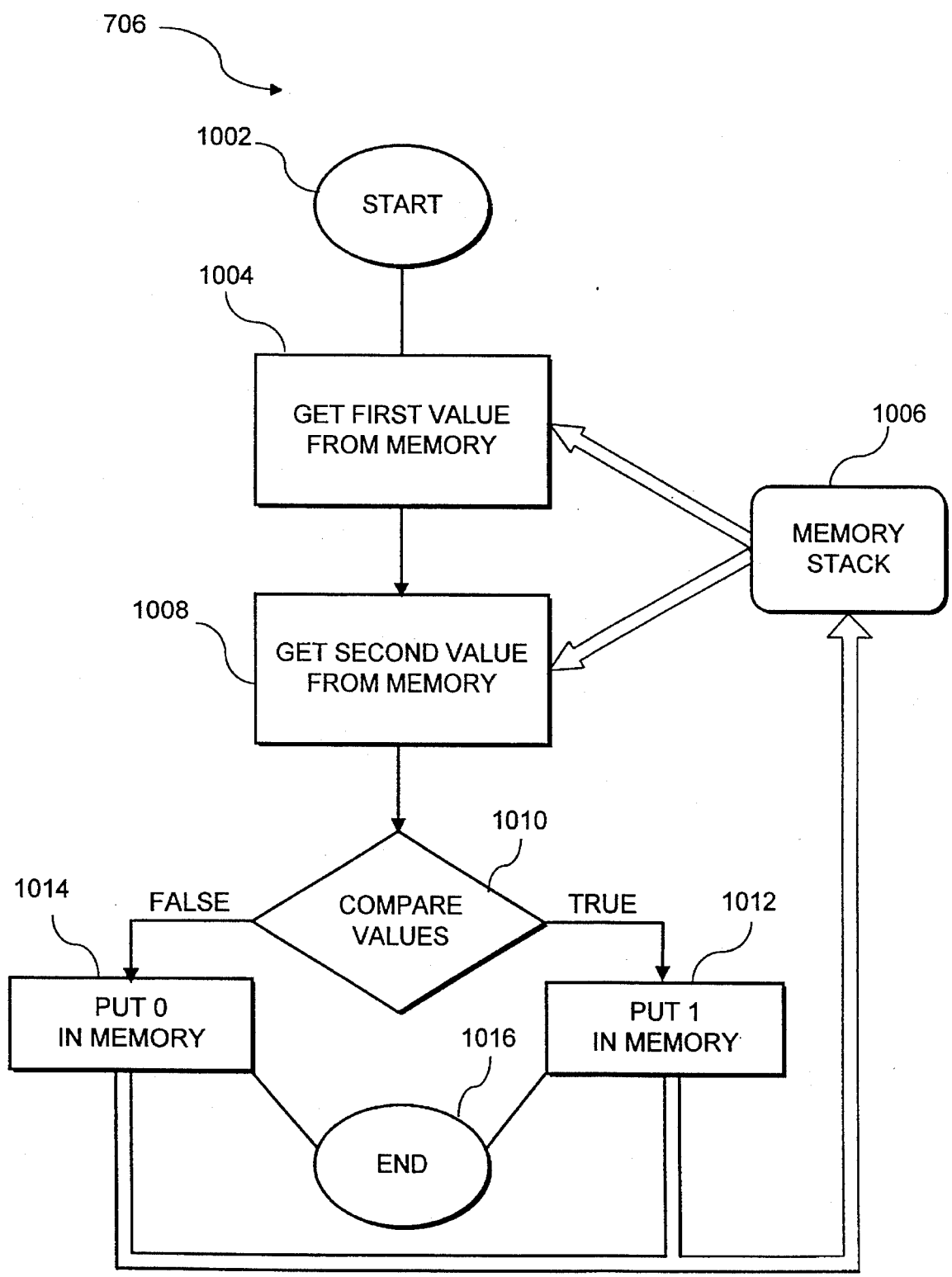
F I G. 10

CONDITIONAL BRANCH OPERATION

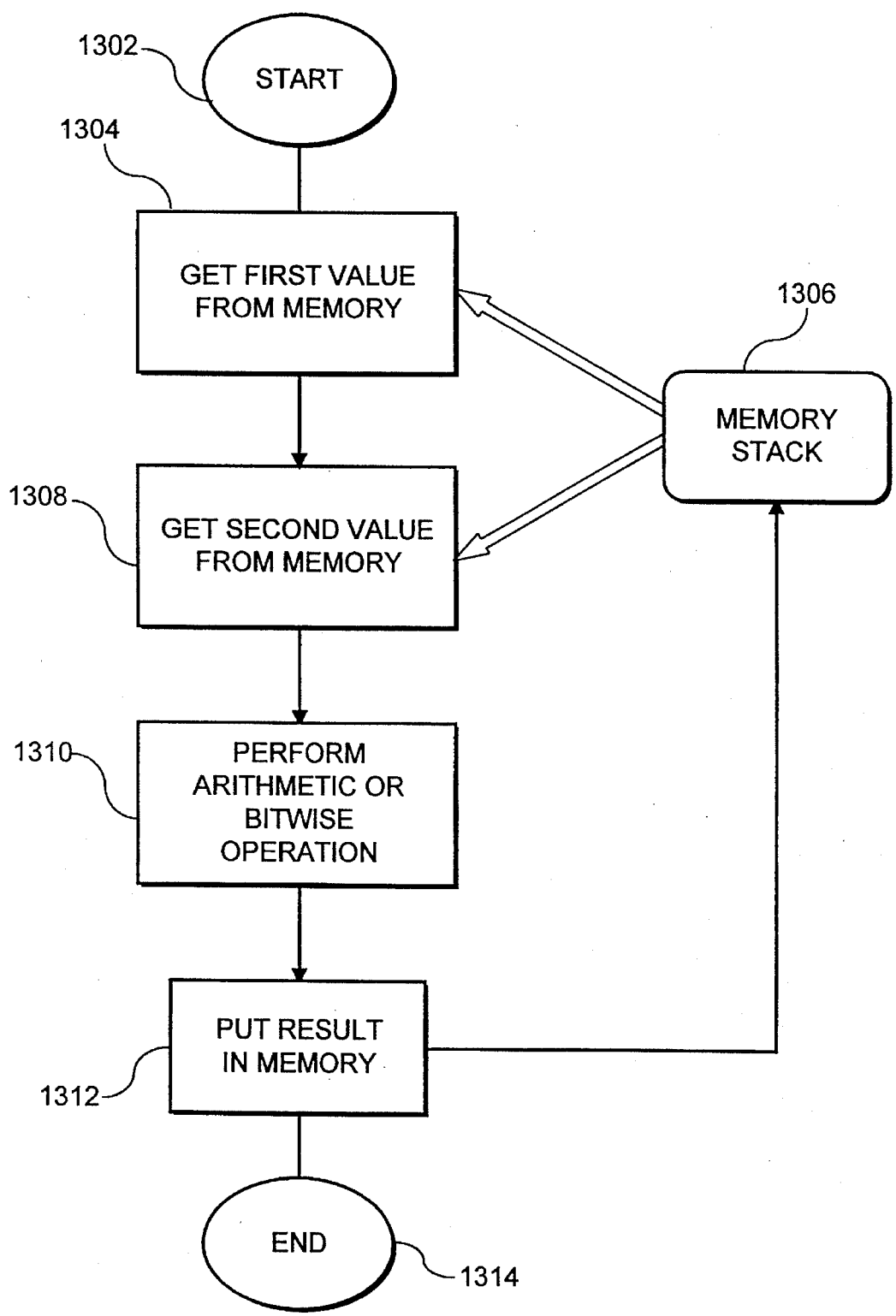
F I G. 13

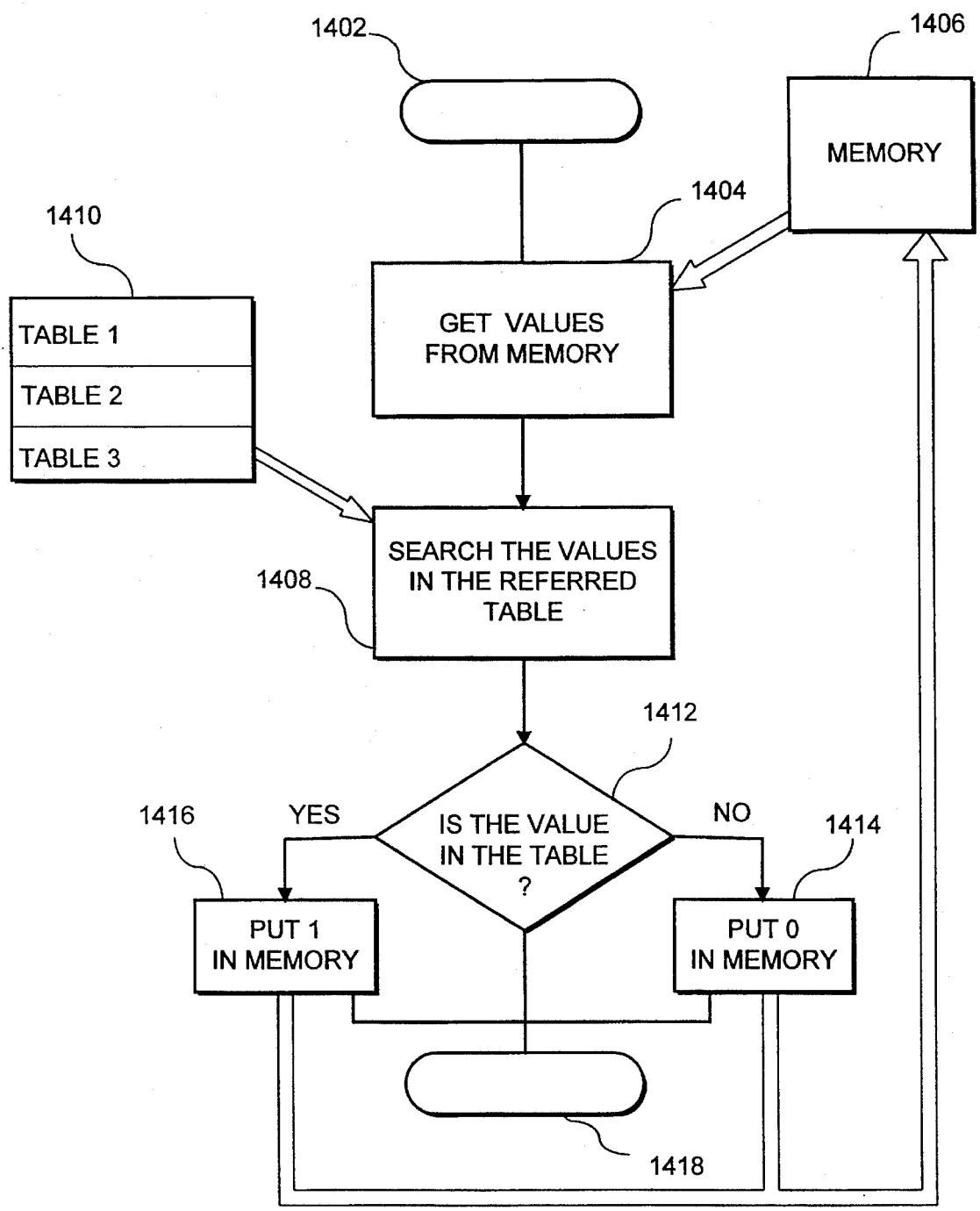
F I G. 14

SYSTEM FOR SECURING INBOUND AND OUTBOUND DATA PACKET FLOW IN A COMPUTER NETWORK

BACKGROUND OF THE INVENTION

This application relates, in general, to a method for controlling computer network security. More specifically it relates to an easily alterable or expandable method for computer network security which controls information flow on the network from/to external and internal destinations.

Connectivity and security are two conflicting objectives in the computing environment of most organizations. The typical modern computing system is built around network communications, supplying transparent access to a multitude of services. The global availability of these services is perhaps the single most important feature of modern computing solutions. Demand for connectivity comes both from within organizations and from outside them.

Protecting network services from unauthorized usage is of paramount importance to any organization. UNIX workstations, for example, once connected to the Internet, will offer all the services which it offers another station on the next table to the entire world. Using current technology, an organization must give up much of its connectivity in order to prevent vulnerability, even to the extent of eliminating all connections to the outside world or other sites.

As the need for increased security grows, the means of controlling access to network resources has become an administrative priority. In order to save cost and maintain productivity, access control must be simple to configure and transparent to users and applications. The minimization of setup costs and down time are also important factors.

Packet filtering is a method which allows connectivity yet provides security by controlling the traffic being passed, thus preventing illegal communication attempts, both within single networks and between connected networks.

Current implementation of packet filtering allows specification of access list tables according to a fixed format. This method is limited in its flexibility to express a given organization's security policy. It is also limited to the set of protocols and services defined in that particular table. This method does not allow the introduction of different protocols or services which are not specified in the original table.

Another method of implementing packet filtering is tailoring the computer operating system code manually in every strategic point in the organization. This method is limited by its flexibility to future changes in network topology, new protocols, enhanced services and to future security threats. It requires a large amount of work by experts modifying proprietary computer programs, making it insufficient and expensive to setup and maintain.

SUMMARY OF THE INVENTION

It is a general object of the present invention to produce a flexible, easily-alterable security method which controls information flow on a computer network.

Another object of the invention is to control information flow on the network from/to internal as well as external destinations.

A further object of the invention is to control information flow by means of a packet filter capable of examining every packet of information flowing past a node in the system.

A still further object of the invention is to provide a generic packet filter module which is controlled by a set of instructions to implement a given security policy at a node to accept (pass) or reject (drop) the packet.

Yet another object of the invention is to provide a security method for a computer network which is easily alterable by the system administrator without the need to change the nature of the packet filter itself or to write extensive code.

These and other objects, features and advantages are provided by a method of operating a computer network, in which data is passed in said network as data packets, for controlling the passage of said data packets in the network according to a security rule, the method comprising the steps of generating, in at least one computer in the network, a definition of each aspect of the network controlled by a security rule; generating said security rule, in said computer, in terms of said aspect definitions, for controlling at least one of said aspects; converting said security rule into a set of filter language instructions for controlling operation of a packet filtering module which controls passage of said data packet; providing a packet filter module in at least one of network entity to control the passage of data packets in accordance with said rule, said module emulating said packet filtering module; said module reading and executing said instructions for operating said packet filtering module virtual machine to either accept or reject the passage of said packet in said network.

Another aspect of the invention includes a security system for a computer network in which data is passed in said network as data packets, said system controlling the passage of said data packets in the network according to a security rule, where each aspect of said network controlled by said security rule has been defined, said security rule has been defined in terms of said aspects and converted into a filter language instructions, a method for operating the system comprising the steps of providing a packet filter module in at least one entity of the network to be controlled by said security rule, said module emulating a packet filtering module which controls passage of said data packet; said module reading and executing said instructions for operating said packet filtering module to either accept or reject the passage of said packet in said network.

A further aspect of the invention comprises a security system for a computer network in which data is placed in said network as data packets, said system controlling passage of said data packets in the network according to a security rule, where each aspect of said network controlled by said security rule has been defined, said security rule has been defined in terms of said aspects and converted into a filter language instructions, a method for operating the system comprising the steps of providing a packet filter module in at least one entity of the network to be controlled by said security rule, said module emulating a packet filtering module which controls passage of said data packet; said module reading said executing instructions for a packet filtering operation; storing the results in a storage device; said module reading and executing instructions and utilizing said stored results for operating said packet filter module to accept or reject the passage of said packet in said network.

BRIEF DESCRIPTION OF THE DRAWINGS

FIG. 5 is a flow diagram of an information flow on a computer network employing the present invention;

FIG. 6 is a flow diagram of the operation of the packet filter shown in FIG. 5;

FIG. 7 is a flow diagram showing the virtual machine operations shown in FIG. 6;

FIG. 10 is a flow diagram of the comparison operation method of FIG. 7;

FIG. 13 is a flow diagram of an arithmetic and bitwise operation;

FIG. 14 is a flow diagram of a lookup operation; and

DETAILED DESCRIPTION

Figure 1:
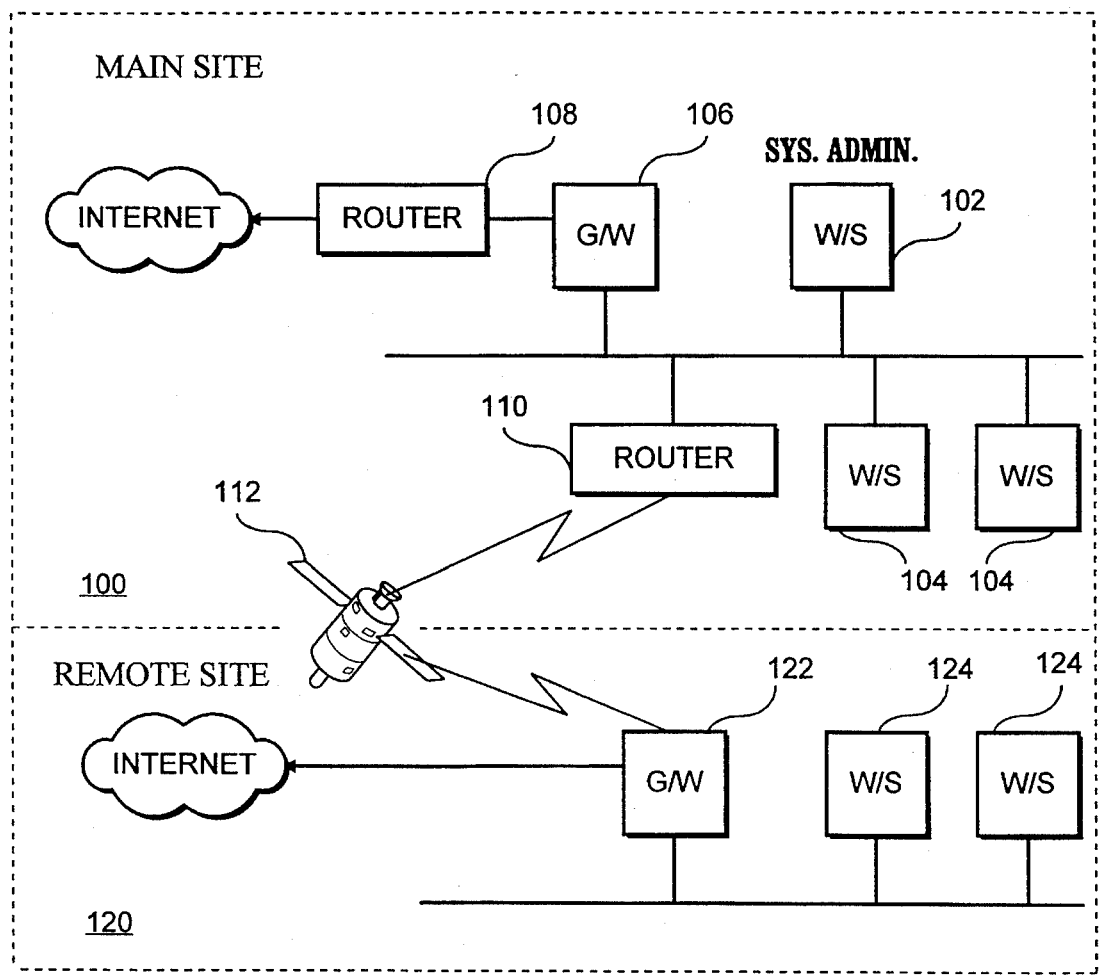
FIG. 1 is an example of a network topology.

Referring now to FIG. 1, an example network topology is shown. In this example, the main site 100 contains a system administrator function embodied in workstation 102. This workstation is coupled to the network which includes workstations 104, router 110 and gateway 106. Router 110 is coupled via satellite 112 to a remote site via gateway 122. Gateway 106 is coupled via router 108 to the Internet. The remote site 120 comprises workstations 124 which are coupled to the network and via gateway 122 to the Internet. The particular configuration shown herein is chosen as an example only and is not limitive of the type of network on which the present invention can work. The number configurations that networks can take are virtually limitless and techniques for setting up these configurations are well known to those skilled in the art. The present invention can operate on any of these possible configurations.

Figure 2:
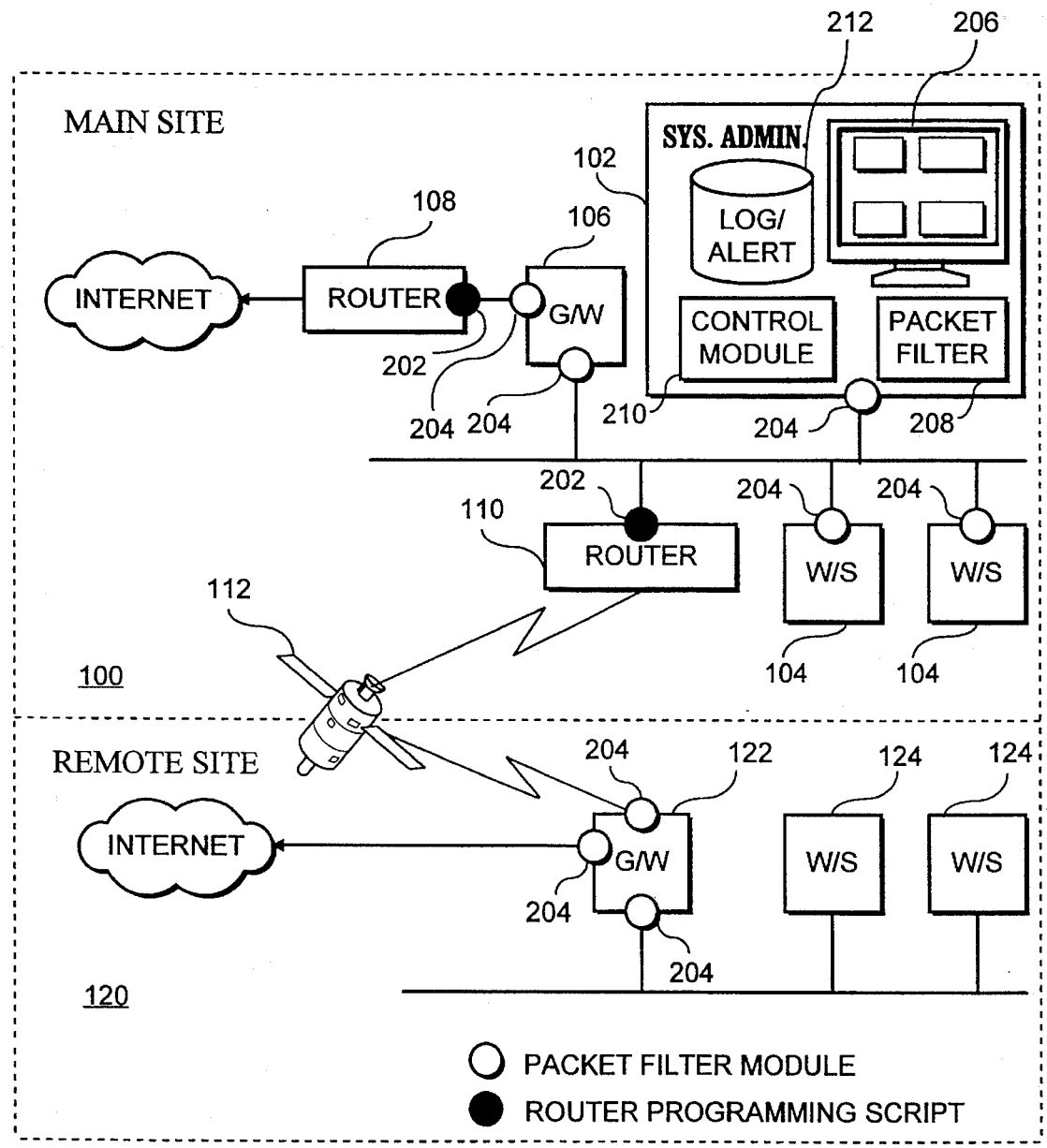
FIG. 2 shows a security system of the present invention applied to the network topology of FIG. 1.

FIG. 2 shows the network of FIG. 1 in which the present invention has been installed. In FIG. 2, elements also shown in FIG. 1 have the same reference numerals. As shown, the system administrator 102 includes a control module 210, a packet filter generator 208, a display 206 and a storage medium 212. Packet filters 204 have been installed on the system administrator, workstations 104 and gateway 106. Gateway 106 has two such filters, one on its connection to the network and one on its connection to the router 108. Routers 108 and 110 each have a programming script table which is generated by the security system, but which forms no part of the present invention, and will not be described in detail. These tables correspond to the tables that are currently utilized to program routers, as is well known to those skilled in the art.

Packet filters 204 are also installed on the gateway 122 of the remote site 120. One packet filter is installed on the connection between the satellite 112 and the gateway 122, a second packet filter is installed on the connection between the Internet and gateway 122 and a third packet filter is installed on the connection between the gateway and the network.

Information flows on the network in the form of packets, as is well known to those skilled in the art. The location of the packet filters in FIG. 2 is chosen so that data flow to or from a particular object of the network, such as a workstation, router or gateway can be controlled. Thus, workstations 104 each have a packet filter so that the information flow to/from these workstations is separately controlled. At the remote site 120, however, the packet filter is placed on the connection between the gateway 122 and the network, thus there is no individual control over the data flow to/from the workstations 124. If such individualized control were required, packet filters could be placed on each of the workstations 124, as well. Each of the packet filters is installed at the time that the network is set up or the security system is installed, although additional packet filters can be installed at a later date. The packet filters are installed on the host device .such as the workstation or gateway at which protection is desired.

Each of the packet filters operates on a set of instructions which has been generated by the packet filter generator 208 in the system administrator 102. These instructions enable complex operations to be performed on the packet, rather than merely checking the content of the packet against a table containing the parameters for acceptance or rejection of the packet. Thus, each packet filter can handle changes in security rules with great flexibility as well as handle multiple security rules without changing the structure of the packet filter itself.

Figure 3B:
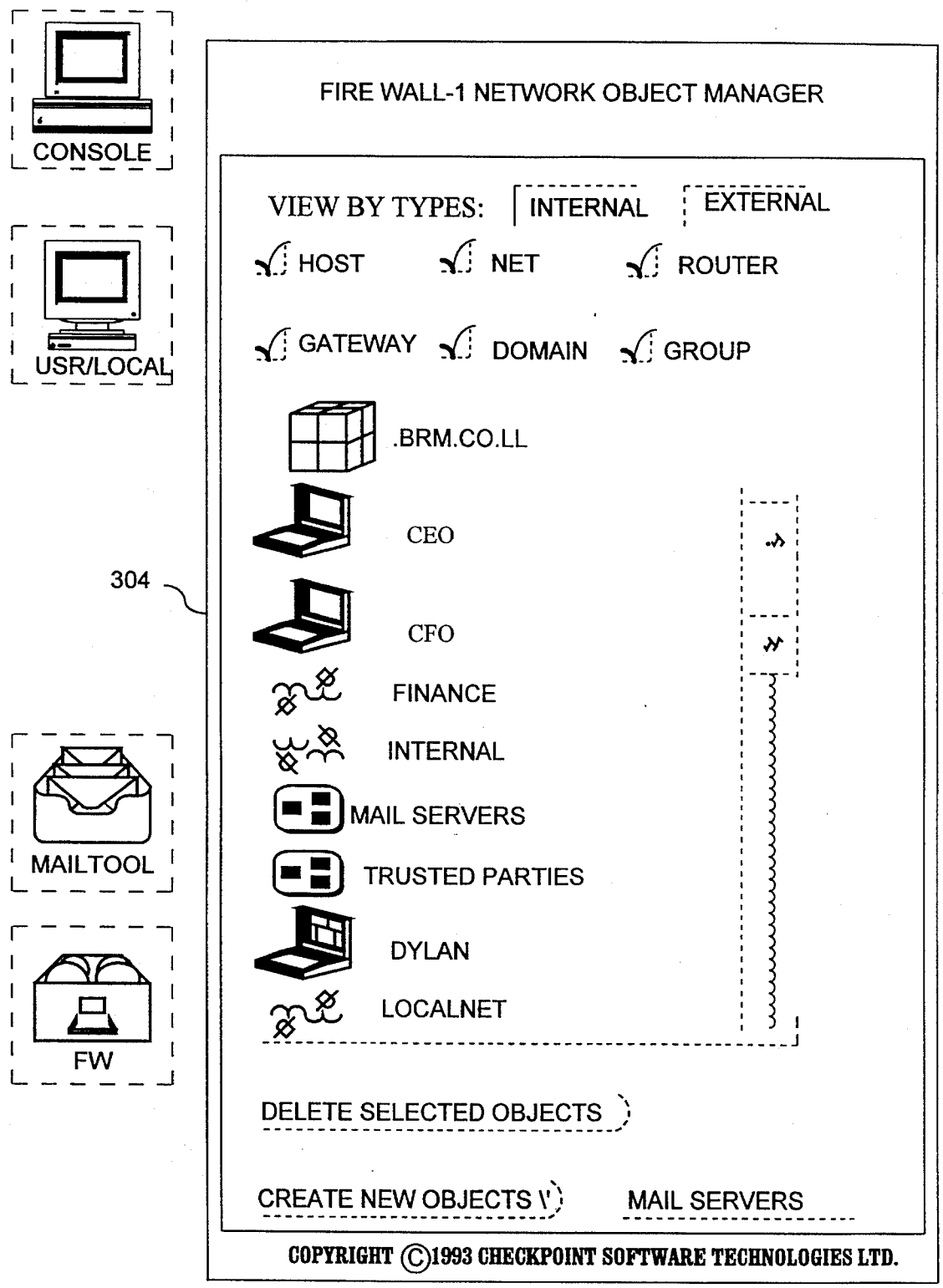
FIG. 3 shows the computer screen of the network administrator of FIG. 2 in greater detail.
Figure 3C:
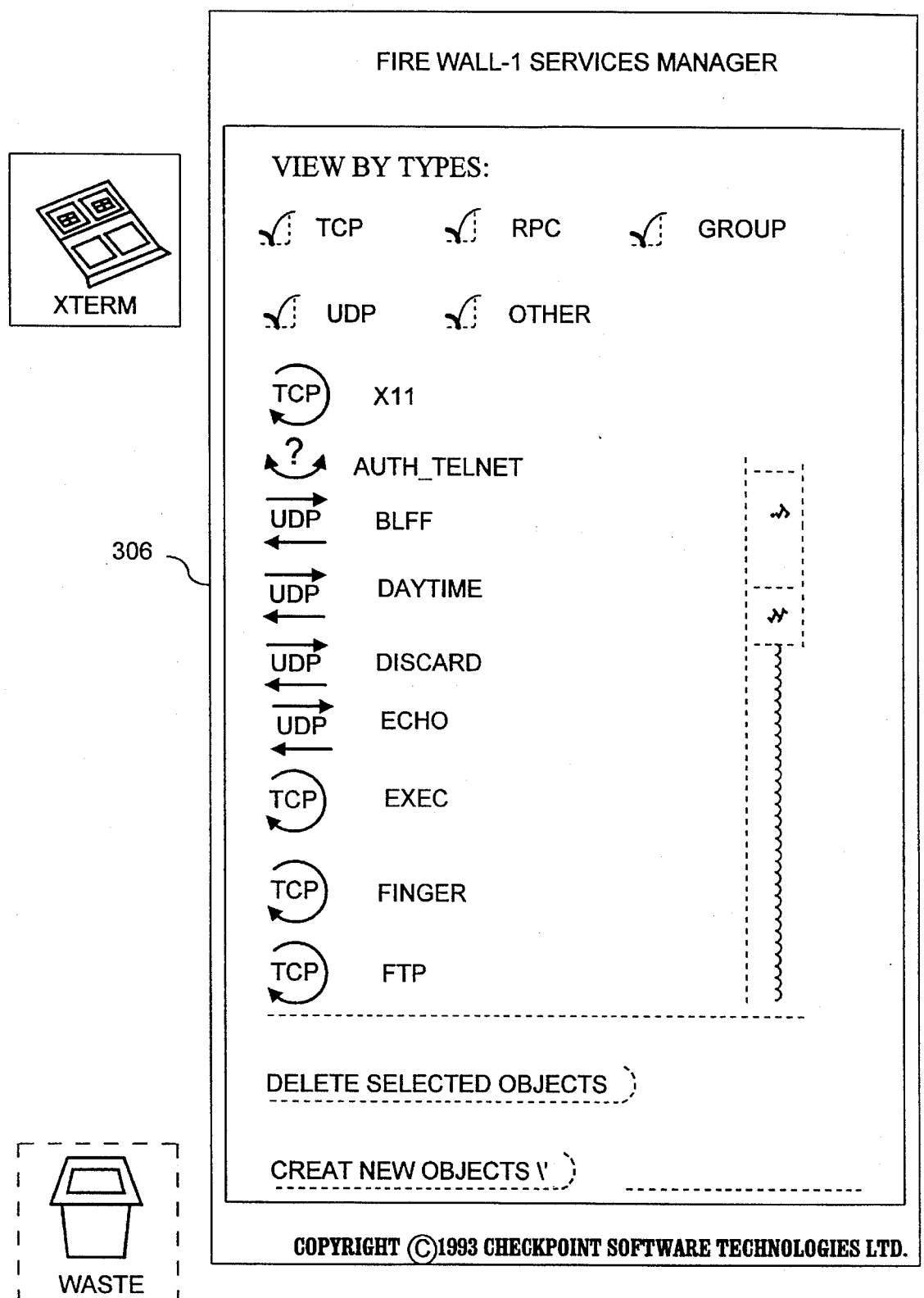
Figure 3D:
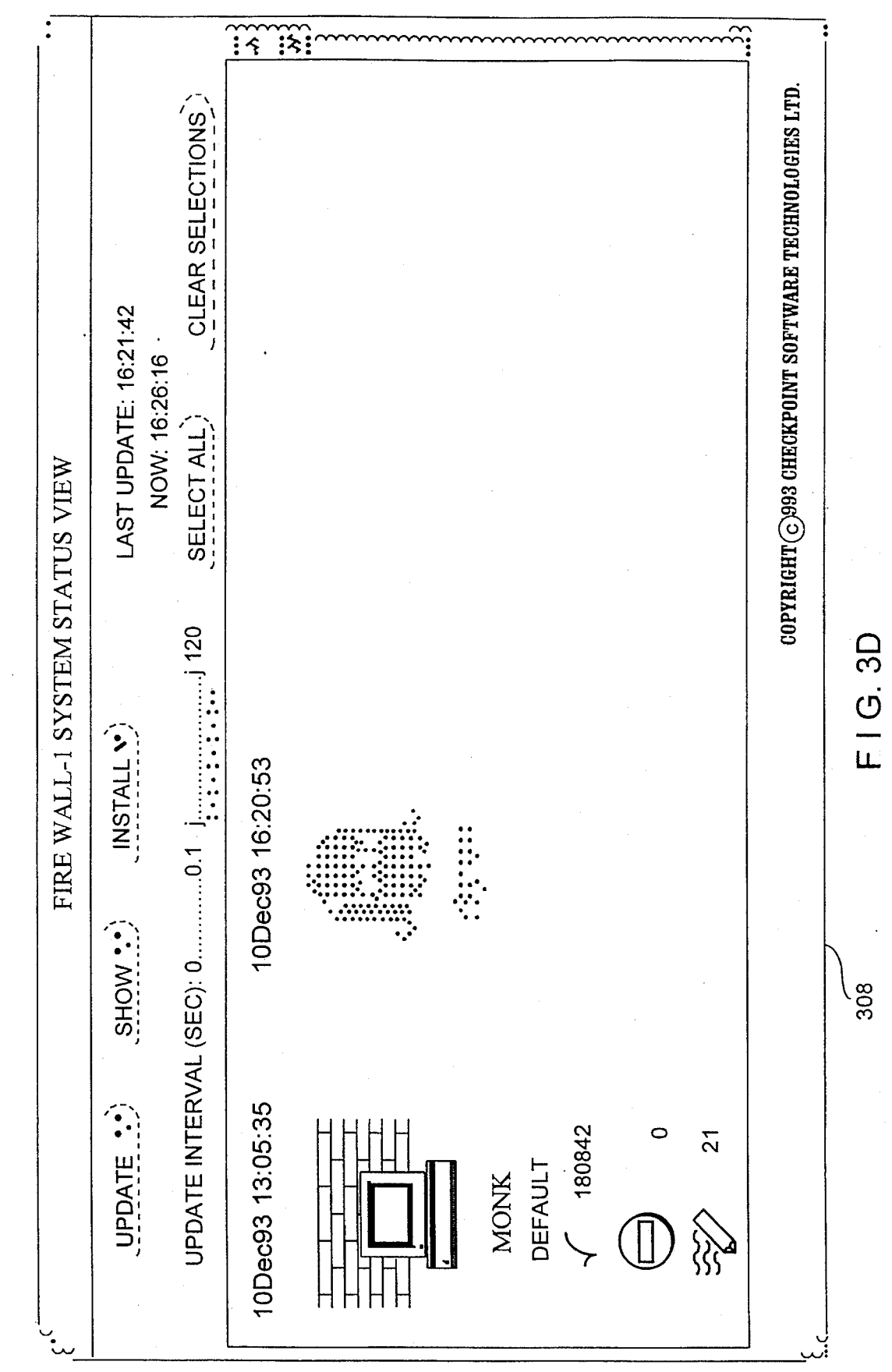

The system administrator enters the security rules via a graphical user interface (GUI) which is displayed upon the monitor 206 and explained in more detail with respect to FIG. 3. This information is processed by the packet filter generator 208 and the resulting code is transmitted to the appropriate packet filter or filters in the network to perform the function that is desired. Control module 210 enables the system administrator to keep track of the operations of the network and storage 212 can be utilized to keep logs of operations on the network and attempts of illegal entry into the network. The system operator can thereby be provided with full reports as to the operation of the network and the success or failure of the security rules. This enables the security administrator to make those changes that are appropriate in order to maintain the security of the network without limiting its connectivity.

FIG. 3 shows the computer screen 206 in FIG. 2 in more detail. The screen is broken into four windows, two smaller windows at the left side and two larger windows at the right side. Network objects and services are two aspects of the network which must be defined in the security method of the present invention. Window 304 is used to define network objects such as the workstations, gateways and other computer hardware connected to the system. It is also possible to group various devices together such as, for example, the finance department, the research and development department, the directors of the company. It is thus possible to control data flow not only to individual computers on the network, but also to groups of computers on the network by the appropriate placement of packet filters. This allows the system operator have a great deal of flexibility in the managing of communications on the network. It is possible for example to have the chief financial officer as well as other higher ranking officials of the company such as the CEO and the directors able to communicate directly with the finance group, but filter out communications from other groups. It is also possible to allow electronic mail from all groups but to limit other requests for information to a specified set of computers. This allows the system operator to provide internal as well as external security for the network. The object definition would include the address of the object on the network, as well as a name or group whether the object is internal or external to the network, whether or not a packet filter has been installed on this object and a graphical symbol. The graphical symbol is used in connection with the rule base manager 302.

Similarly, network services are defined in block 306 on the screen. These network services can include login, route, syslog and telnet, for example. Each service is defined by generic and specific properties. The generic properties include the code string that identifies the service, for example "dport" (destination port) which is equal to 23 for telnet. The code string that identifies the incoming and outgoing packets are identified. Specific properties include the name of the service, the port used to provide the service, the timeout in seconds of how long a connectionless session may stay inactive, that is, having no packet transmitted in either direction before assuming that the session is completed. Other elements of a service definition might include the program number for RPC services and the outbound connections for accepted services that use connectionless protocols such UDP. The graphic symbol and its color are specified.

Block 302 is the rule base manager which allows the new security rule to be entered into the system in a graphical manner, thus freeing the system administrator from having to write code to implement a particular security rule or to change a security rule. Only four elements are required to enter the new security rule into the system. The first element is the source of the data packet and the third element is the destination of the packet. The second element is the type of service that is involved and the fourth element is the action that should be taken. The action that can be taken includes accept the packet in which case the packet is passed from the source to the destination or reject the packet in which case the source is not passed from the source to the destination. If the packet is rejected, no action can be taken or a negative acknowledgement can be sent indicating that the packet was not passed to the destination. In addition, a further element which can be specified is the installation location for the rule which specifies on which objects the rule will be enforced (see FIG. 2). If an installation location is not specified, the system places the packet filter module on the communication destination by default. These objects are not necessarily the destination. For example, a communication from the Internet and destined for a local host must necessarily pass through a gateway. Therefore, it is possible to enforce the rule on the gateway, even though the gateway is neither the source nor the destination. By entering the data with acronyms or graphic symbols, each rule can quickly be entered and verified without the need for writing, compiling and checking new code for this purpose. Thus, the system administrator need not be an expert in programming a computer for security purposes. As long as the service is one of the services already entered into the system, the computer serving as the host for the system administrator function will process the information into a set of instructions for the appropriate packet filter, as described in greater detail below.

Block 308 is a system snapshot which summarizes the setup and operations of the security system. It is not required to practice the present invention. The system snapshot displays a summary of the system using graphical symbols. The summary can include, for example, the host icon, host name, rule base name, which is the name of the file containing the rule base, and the date the rule base was installed on the host. It can also show the status of the host indicating whether or not there have been communications with the host as well as the number of packets inspected by, dropped and logged by the host.

Figure 4:
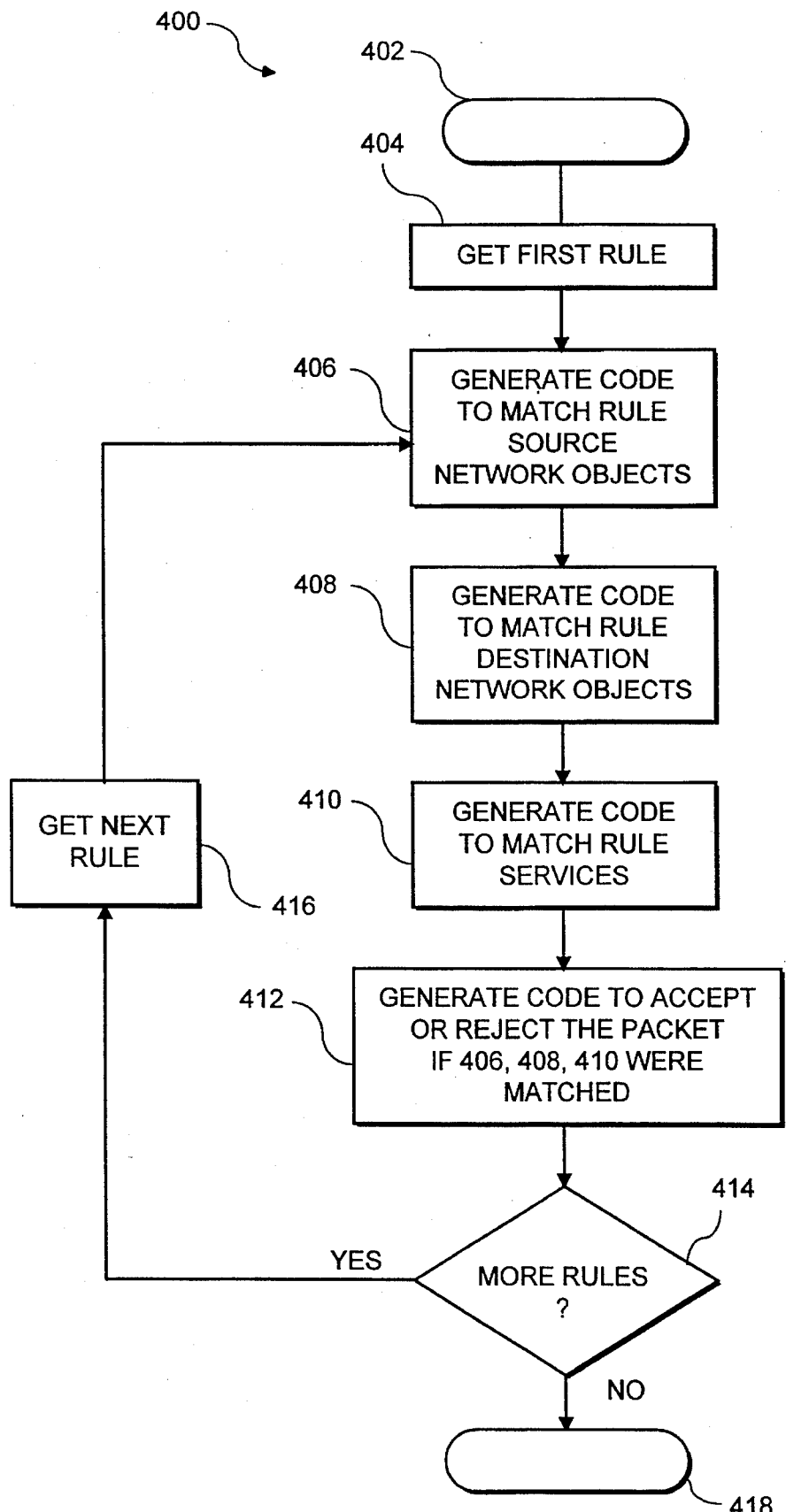
FIG. 4 is a flow diagram of the subsystem for converting graphical information to filter script.

FIG. 4 shows a flow chart of the subsystem for converting the information on the GUI to a filter script which contains the rules utilized for the packet filter. In the preferred embodiment, the output of the filter script generator is compiled into object code which is then implemented by the packet filter module, as described below.

The subsystem 400 starts at 402, proceeds to block 404 which is obtains the first rule from the GUI. The first rule is the first line on the screen in which a new security rule has been identified, as shown in FIG. 3. Control then proceeds to block 406 in which code is generated to match the rule source network objects. That is, the source of the packet is entered into the source code block as representing one of objects of the system from which the data packet will emanate. Control then passes to block 408 in which code is generated in the destination code block to indicate which object of the network the data packet is destined for. Control then passes to block 410 in which code is generated to match the rule services that were chosen. The rule services have been defined previously and are stored within the system or, if not defined, will be defined at the time the security rule regulating the service is entered into the system. Control then passes to block 412 in which code is generated to accept or reject the packet if the data blocks 406, 408 and 410 were matched, that is, the results of the checks were true. The action to accept or reject is based upon the action chosen in the security rule. Control then passes to the decision block 414 which determines whether or not more rules are to be entered into the system. If no more rules are to be entered into the system, the subsystem terminates at block 418. If more rules are to be entered into the system, control passes to block 416 which obtains the next rule and passes control back to block 406 at which time the process repeats and the next security rule, found on the next line the GUI is processed.

Communication protocols are layered, which is also referred as a protocol stack. The ISO (International Standardization Organization) has defined a general model which provides a framework for design of communication protocol layers. This model serves as a basic reference for understanding the functionality of existing communication protocols.

| ISO MODEL | | |
|---|---|---|
| Layer | Functionality | Example |
| 7 | Application | Telnet, NFS, Novell NCP |
| 6 | Presentation | XDR |
| 5 | Session | RPC |
| 4 | Transport | TCP, Novel SPX |
| 3 | Network | IP, Novell IPX |
| 2 | Data Link (Hardware Interface) | Network Interface Card |
| 1 | Physical (Hardware Connection) | Ethernet, Token Ring, T1 |

Different communication protocols employ different levels of the ISO model. A protocol in a certain layer may not be aware to protocols employed at other layers. This is an important factor when making security actions. For example, an application (Level 7) may not be able to identify the source computer for a communication attempt (Levels 2–3), and therefore, may not be able to provide sufficient security.

FIG. 5 shows how a filter packet module of the present invention is utilized within the ISO model. The communication layers of the ISO model are shown at 502 at the left hand portion of FIG. 5. Level 1, block 504, is the hardware connection of the network which may be the wire used to connect the various objects of the network. The second level, block 506 in FIG. 5 is the network interface hardware which is located in each computer on the network. The packet filter module of the present invention intercedes between this level and level 3 which is the network software. Briefly, for the sake of completeness, the other levels of the ISO model are level 4, block 510 which relates to the delivery of data from one segment to the next, level 5, block 512, synchronizes the opening and closing of a "session" on the network. Level 6, block 514 relates to the changing of data between various computers on the network, and level 7, block 516 is the application program.

A packet entering the computer on which the packet filter module resides passes through layers 1 and 2 and then is diverted to the packet filter 520, shown on the right hand portion of FIG. 5. The packet is received in block 522. In block 524, the packet is compared with the security rule and a determination is made as to whether or not the packet matches the rule. If the packet matches the rule, it may be logged on the system administrator's log and, if an illegal attempt has been made to enter the system, an alert may be issued. Control then passes to block 534 in which a decision is made whether or not to pass the packet based upon the requirements of the security rule. If the decision is to pass the packet, the packet is then passed to level 3, block 508. If a decision is not to pass the packet, a negative acknowledgement (NACK) is sent at block 528, if this option has been chosen, and control passes to block 530 where the packet is dropped, that is, it is not passed to its destination. Similarly, if an application generates a packet which is to be sent to another destination, the packet leaves the ISO model at level 3, block 508 and enters block 522 and proceeds by an identical process except that if the packet is to be passed it is passed to level 2, block 506 and not level 3, block 508. On level 2, the packet is then sent onto the network at block 504, level 1. If the packet does not match the rule, the next rule will be retrieved and the packet examined to see if it matches this rule. A default rule is provided which matches any packet regardless of the source destination or service specified. This "empty rule" only has an action, which is to drop the packet. If no other rule is matched, this rule will be retrieved and will be effective to drop the packet. Dropping the packet is the safest step to take under these circumstances. The "empty rule" could, of course, be written to pass the packet.

Referring to FIG. 6, 600 is a detailed description of the block 520 of FIG. 5. The generalized description in FIG. 6 and the more detailed descriptions shown in FIGS. 7–10 comprise a definition of the term "packet filter module" as the term is utilized herein. The capabilities shown in those figures are the minimal capabilities for the packet filter module to operate. FIGS. 11–15 show addition features which may also be included in the packet filter module, but are not required in the minimal definition of the term.

The packet filter module is embodied in a "virtual machine", which, for the purposes of this application, may be defined as an emulation of the machine shown in FIGS. 6–10 residing in the host computer, which is a computer on the network.

The virtual machine starts at block 602 in which the packet is received, which corresponds to block 522 of FIG. 5. Control passes to block 604 in which the filter operations are obtained from the instruction a memory (not shown). These filter operations are the filter operations that have been generated by the packet filter generator 208 shown in FIG. 2. Control then passes to block 604 in which the filter operations are obtained and then to block 606 in which the memory 618 is initialized. In block 608, the first virtual machine operation is obtained and performed in block 610. The virtual machine contains a memory mechanism such as a stack or register 618 which may be utilized to store intermediate values. The utilization of this stack or register is shown in greater detail in connection with table 1 below. Control then passes to decision block 614 in which it is determined whether or not the stop state has been reached. If the stop state has been reached, the decision will have been made to accept or reject the packet, which decision is implemented at block 616. If the packet has been passed, the packet will proceed as shown in FIG. 5. If the packet is rejected, it will be dropped and a negative acknowledgement may be sent as shown in blocks 528 and 530. If the stop state has not been reached in block 614, the next operation is obtained in block 616 and the process repeats starting with block 610.

The type of operations that can be performed in step 5, block 610 are shown more clearly in FIG. 7. In FIG. 7, block 610 and block 614 are identical to the blocks shown in FIG. 6. Connection 613 is interrupted by three operations which are shown in parallel. For the operation that is to be performed in block 610, control will pass to the appropriate block 702, 704 or 706 in which that task will be performed. In block 702 data extraction will be performed, in block 704 logical operations will be performed and in block 706 a comparison operation will be performed. As shown at the right hand portion of FIG. 7, other blocks can be added in parallel to the operations capable of being performed by the virtual machine. The subset shown as blocks 702, 704 and 706 are the essential elements of the virtual machine of the present invention. These elements are shown in greater detail in FIGS. 8, 9 and 10, respectively. Additional elements which may optionally be included in the operations capable of being performed by the virtual machine are shown in FIGS. 11–15, respectively.

Figure 8:
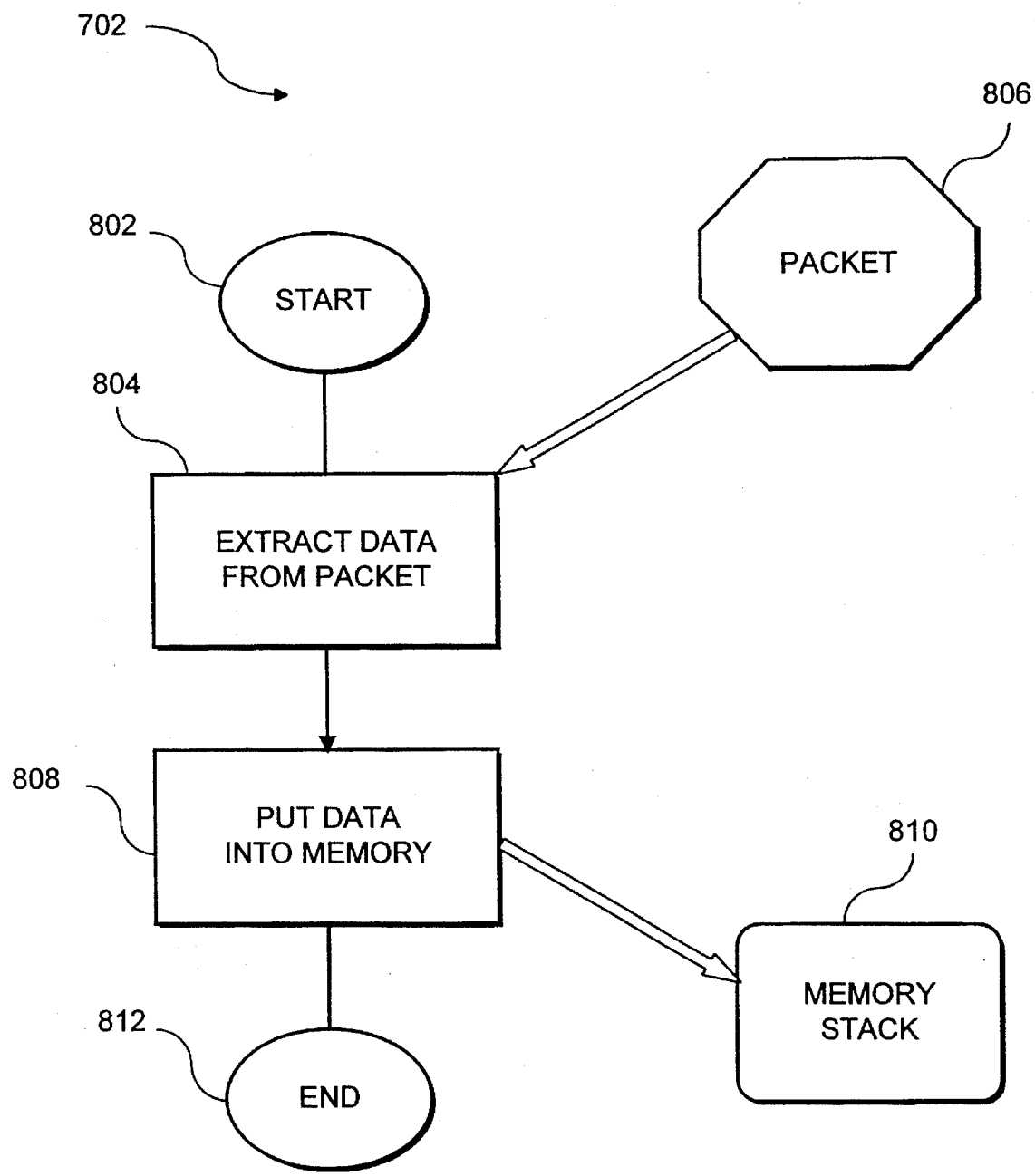
FIG. 8 is a flow diagram of the data extraction method of FIG. 7.

The data extraction block 702 is shown in greater detail in FIG. 8. The process starts at block 802 and control passes to block 804 in which data is extracted from a specific address within the packet 806. This address is taken from the stack memory 618 or from the instruction code. The amount of data extracted is also determined by the stack memory or the instruction code. The extracted data is put into the memory stack 810 at block 808. The process terminates at block 812. In these figures, control flow is shown by arrows having a single line whereas data flow is shown by arrows having double lines.

Figure 9:
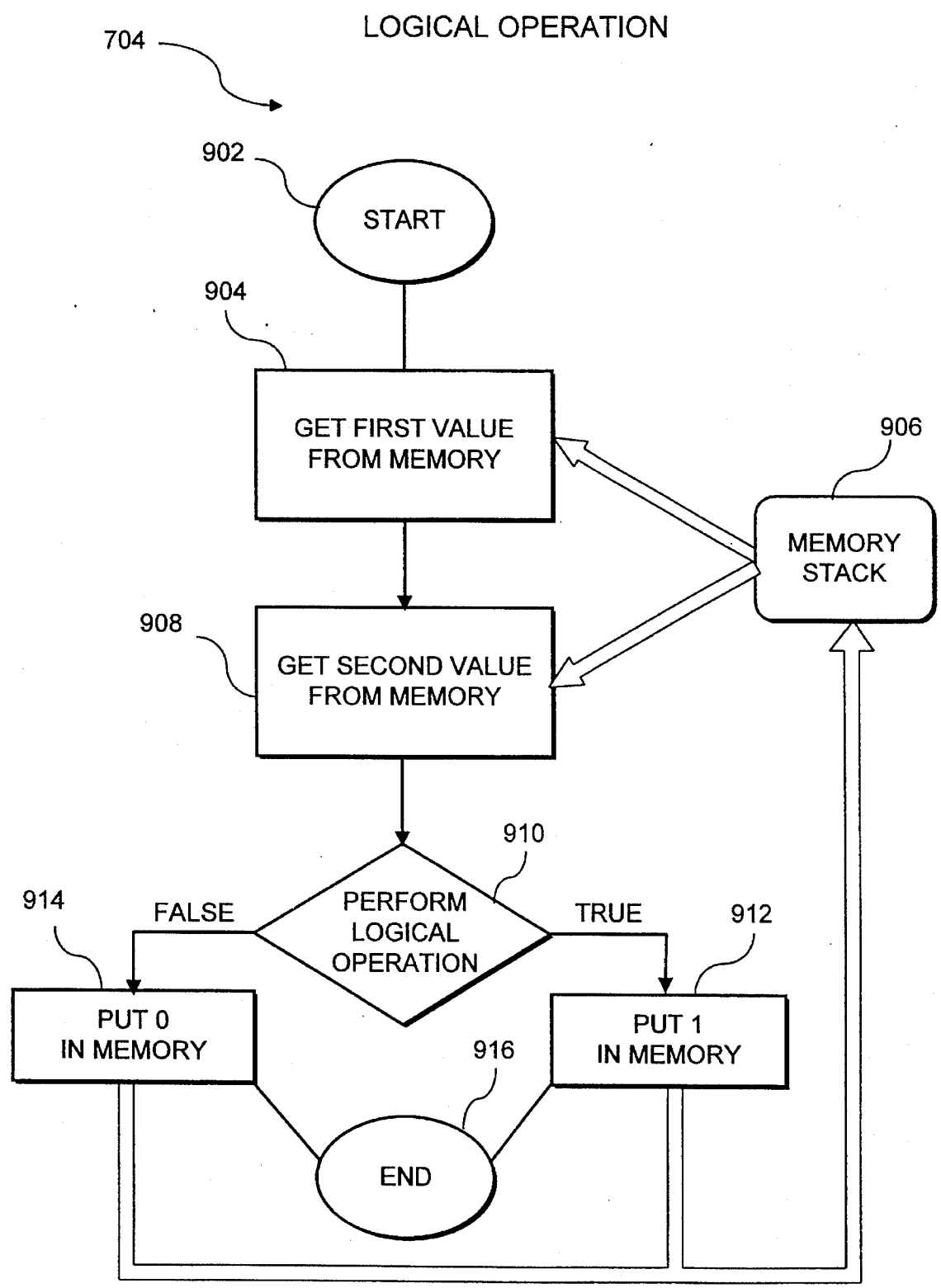
FIG. 9 is a flow diagram of the logical operation method of FIG. 7.

FIG. 9 shows logical operation 704 in greater detail. The logical operation starts at block 902 and control passes to block 904 in which the first value is obtained from the memory 906. In block 908 a second value is obtained from the memory and the logical operation is performed in block 910. If the logical operation is true, a one is placed in the memory 906 at block 912 and if the logical operation is false, a zero is placed in the memory 906 at block 914. The process terminates at block 916.

The third and last required operation for the virtual machine is shown in greater detail in FIG. 10. The comparison operation, block 706, starts at block 1002 and control passes to block 1004 in which the first value is obtained from memory 1006. Control passes to block 1008 in which a second value is obtained from memory 1006. A comparison operation between the first and second values takes place at block 1010. If the comparison operation is true, a one is placed in memory 1006 at block 1012 and if the comparison operation is false a zero is placed in memory 1006 at block 1014. The process terminates in block 1016.

Figure 11:
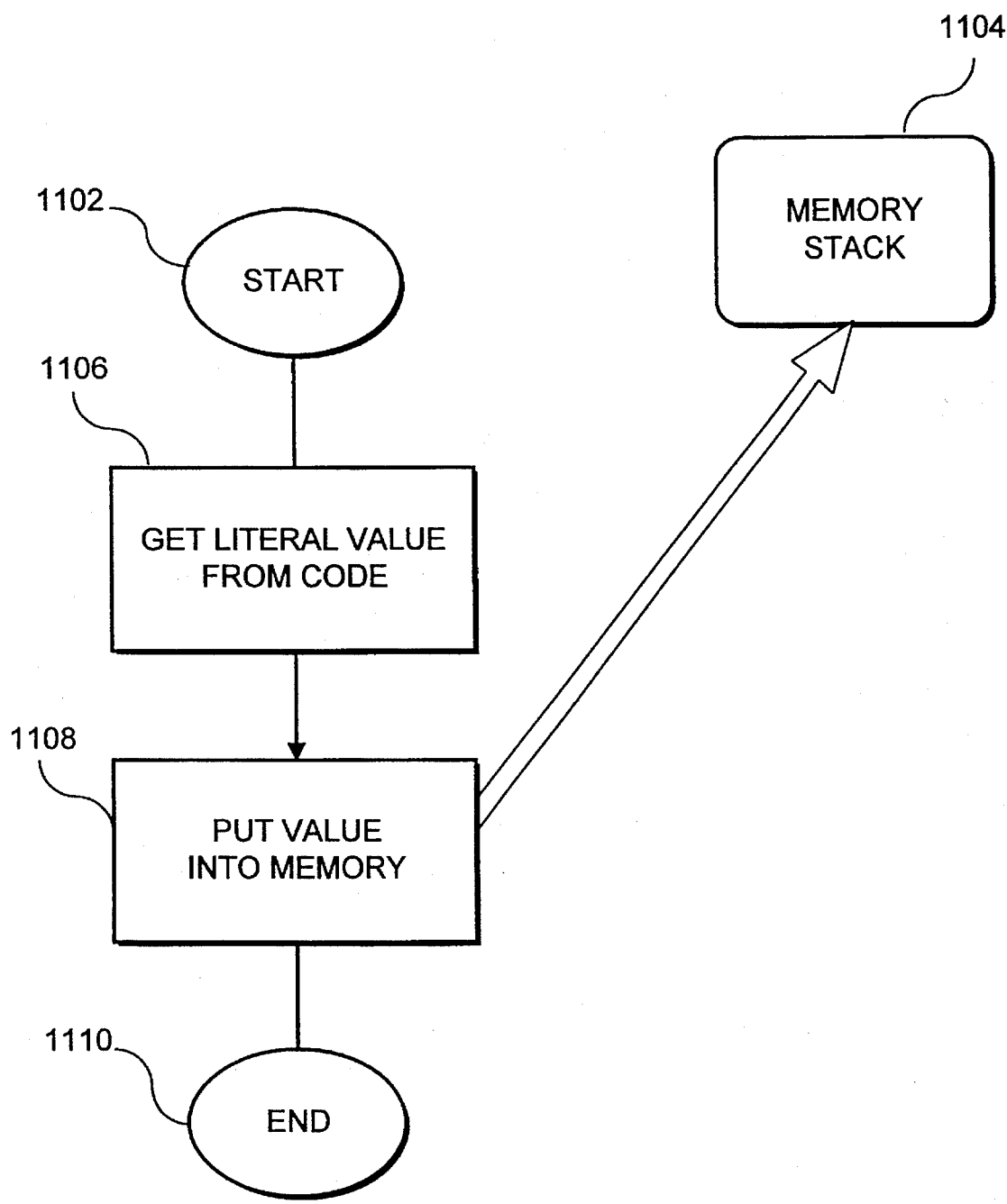
FIG. 11 is a flow diagram of the method of entering a literal value to memory.

The following operations are not shown in FIG. 7 but may be added at the right side of the figure at the broken lines and are connected in the same manner as blocks 702, 704 and 706, that is, in parallel. FIG. 11 shows the entering of a literal value into the memory. The process starts at block 1102 and control passes to block 1106 in which the literal value is obtained from the instruction code. The value is placed into the memory at block 1108 and the process ends at block 1110.

Figure 12:
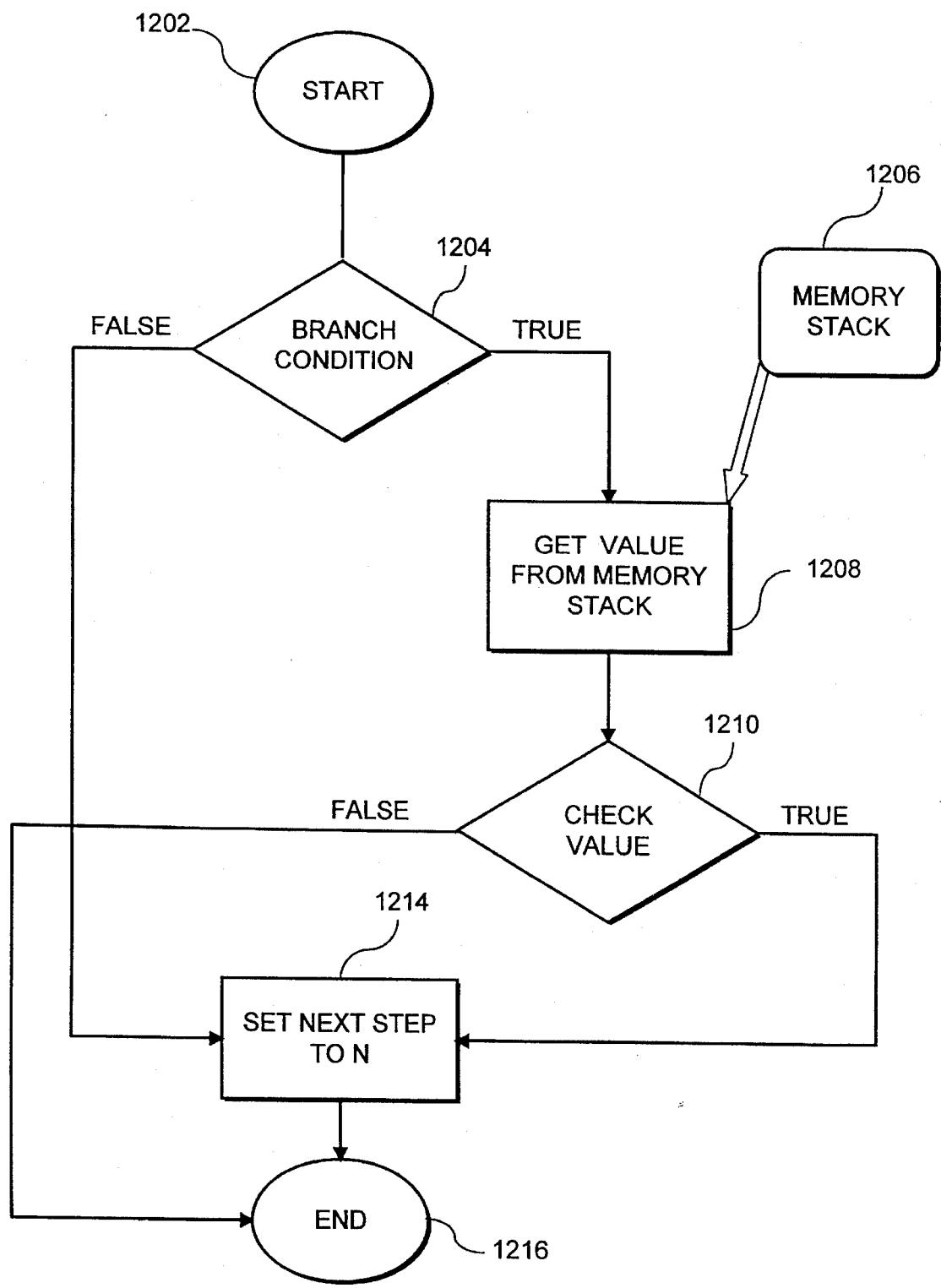
FIG. 12 is a flow diagram of a conditional branch operation.

A conditional branch operation is shown in FIG. 12. The process starts at block 1202 and control passes to block 1204 in which the branch condition, taken from the instruction code, is checked. If the branch condition is true, the value is obtained from the memory stack 1206 at block 1208 and checked at block 1210. If the results of the comparison in block 1210 is true, the next step is set to N and the process terminates at block 1216. If the comparison in block 1210 is false, the process terminates at block 1216. If the branch condition is false, at block 1204, control passes directly to block 1214.

An arithmetic or bitwise operation is shown in FIG. 13. The process starts at block 1302 and control passes to block 1304 in which the first value is obtained from memory 1306. The second value is obtained from memory 1306 at block 1308 and an arithmetic or bitwise operation is performed on the two values obtained from the memory 1306 in block 1310. The result of the arithmetic or bitwise operation is placed in the memory in block 1312 and the process terminates in block 1314.

Figure 15:
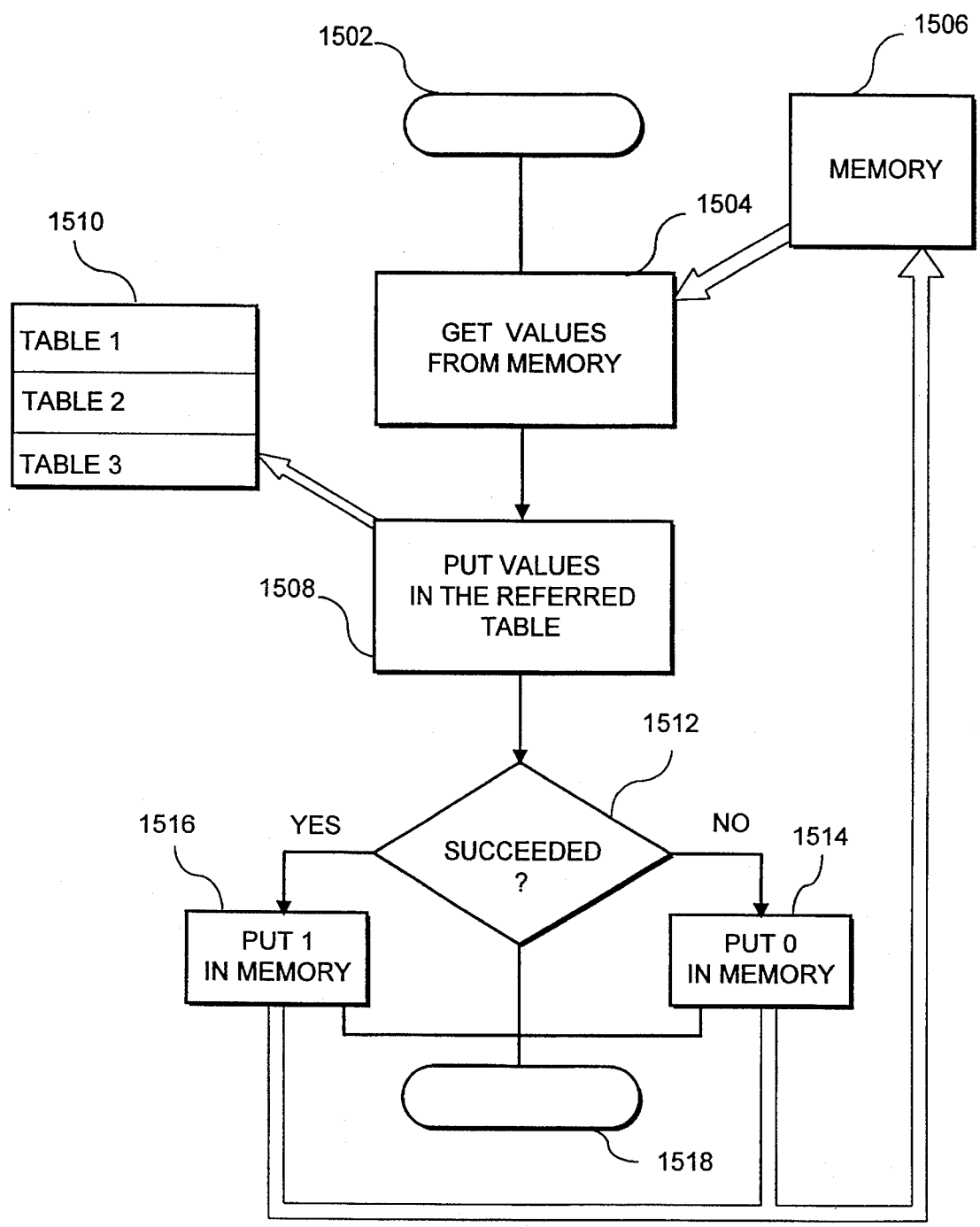
FIG. 15 is a flow diagram of a record operation.

FIG. 14 illustrates a lookup operation which is useful if data needs to passed from a first set of instructions implementing a security rule to a second set of instructions for a second security rule. As shown in block 606 of FIG. 6, the memory is initialized whenever a new security rule is processed. Therefore, information placed in the memory by a first security rule will not be available for use by a second security rule. In order to overcome this problem, a separate memory 1410 is supplied which contains Tables 1–3 which can be utilized for this purpose. The entry of data into the tables is shown in FIG. 15 and described below. The lookup operation starts at 1402 and control passes to 1404 in which values are obtained from memory 1406. Control passes to block 1408 in which data is obtained from Tables 1–3 at block 1410 by searching the values in the referred Table. Control passes to block 1412 in which a decision is made as to whether the block is in the Table. If the decision is yes, a one is placed in memory 1406 at block 1416. If the decision is no, a zero is placed in memory 1406 at block 1414. The process terminates at block 1418.

Referring to FIG. 15, the process starts at block 1502 and control passes to block 1504 in which values are obtained from memory 1506. Control then passes to block 1508 in which values obtained from memory 1506 are placed in the appropriate locations in Tables 1–3 at block 1510. Control passes to block 1512 in which a decision is made as to whether or not the storage values in the Table has succeeded. If the storage has succeeded a one is placed in memory 1506 at block 1516. If the process has not succeeded, a zero is placed in memory 1506 at block 1514. The process terminates at block 1518.

An example of a security rule is implemented using the packet filtering method of the present invention will now be described utilizing as an example the security rule to disallow any Telnet services in the system. Telnet is defined as being a TCP service and having a specific TCP destination port. It will be identified by having a TCP protocol value of 6 in byte location 9 of the packet and by having a destination Telnet protocol number of 23 in byte location 22 of the packet, the value being a two-byte value. This is found in every Telnet request packet.

The first operation in Table 1 is to extract the IP protocol from the packet location 9 and place this in memory. As shown in the "Memory Values" column at the right side of Table 1, this value, 6, is placed at the top of the stack.

The second operation, the TCP protocol (port) number, which is stated to be 6 above, is placed at the second location in memory. In step 3, the values of the first two layers of the stack are compared, obtaining a positive result.

TABLE 1

| | | Drop Telnet Process | | | |
|---|---|---|---|---|---|
| # | Packet Filter Code | Virtual Machine Operation | Memory Values (Stack Order) | | |
| 1 | pushbyte [9] | Extract Operation: Extract IP protocol number from packet location 9 to memory | 6 | | |
| 2 | push 6 | Enter Literal Value to Memory: Put TCP protocol number in memory | 6 | 6 | |
| 3 | eq | Comparison Operation: Compare IP protocol to TCP, obtaining a positive result | 1 | | |
| 4 | pushs [22] | Extract Operation: Extract TCP protocol number from packet location 22 to memory | 1 | 23 | |
| 5 | push 23 | Enter Literal Value to Memory: Put TELNET protocol number in memory | 1 | 23 | 23 |
| 6 | eq | Comparison Operation: Compare TCP protocol to TELNET, obtaining a positive result | 1 | 1 | |
| 7 | and | Logical Operation: Check if protocol both TCP and TELNET are matched | 1 | | |
| 8 | btrue drop | Conditional Branch Operation: If memory value is true, branch to drop state | | | |

The values of 6 at the top two layers of the stack are deleted and a 1, indicative of the positiver result, is placed at the top of the stack. In step 4, the TCP protocol number for packet location 23 is extracted and placed in the memory location at the second layer of the stack. In step 5, the literal value which is the Telnet protocol number is placed into the memory at the third layer of the stack. In step 6, the memory layers 2 and 3 containing the TCP protocol for Telnet is compared with the expected value, obtaining a positive result. The values of the second and third layers of the stack are deleted and replaced by a 1, indicative of the positive result. In step 7, a logical operation is performed to see if both the TCP and Telnet have been matched. This is determined by a AND operation. In this case the result is positive and the ones in the first two layers of the stack are deleted and replaced by a 1 indicative of the positive result. In step 8, a conditional branch operation is performed in which if the memory value is true, the program branches to the drop state. In this case, the result is true and the program branches to the drop state in which the Telnet request is not passed. Thus the rule to drop Telnet has been implemented.

While a particular embodiment of the present invention has been disclosed herein, it would be obvious to those skilled in the art that certain changes and modifications can be made, which are included within the scope of the present invention. Thus, while in the embodiment disclosed herein the packet filter operations are generated as a script which is then compiled into object code, it is obvious to those skilled in the art that these instructions can be generated directly in object code or an interpreter can be utilized in order to avoid the need to compile the script into object code. It would also be obvious to those skilled in the art to perform the operations of the virtual machine in an equivalent manner. For example, the comparison operation can be performed by subtracting a value from the variable and performing an equality operation on the result. All such changes and modifications can be made without departing from the invention as defined by the appended claims.

I claim:

1. A method of inspecting inbound and outbound data packets in a computer network, the inspection of said data packets occurring according to a security rule, the method comprising the steps of:

a) generating a definition of each aspect or the computer network inspected by said security rule;

b) generating said security rule in terms of said aspect definitions, said security rule controlling as least one of said aspects;

c) converting said security rule into a set of packet filter language instructions for controlling the operation of a packet filtering module which inspects said data packets;

d) providing a packet filter module coupled to said computer network for inspecting said data packets in accordance with said security rule, said packet filter module implementing a virtual packet filtering machine; and e) said packet filter module executing said packet filter language instructions for operating said virtual packet filtering machine to either accept or reject the passage of said data packets into and out of said computer network.

2. The method according to claim 1 wherein said aspects include network objects.

3. The method according to claim 1 wherein said aspects include network services.

4. The method according to claim 2 wherein said aspects include network services.

5. The method according to claim 4 wherein said object definitions include the address of said object.

6. The method according to claim 1 wherein the filter language instructions of step c) are in the form of script and further comprising a compiler to compile said script into said instructions executed in step e).

7. The method according to claim 1 wherein in said generating steps a) and b) the aspects of the network and of the security rule are defined graphically.

8. In a security system for inspecting inbound and outbound data packets in a computer network, said security system inspecting said data packets in said computer network according to a security rule, where each aspect of said computer network inspected by said security rule has been previously defined, said security rule previously defined in terms of said aspects and converted into packet filter language instructions, a method for operating said security system comprising the steps of:

a) providing a packet filter module coupled to said computer network in at least one entity of said computer network to be controlled by said security rule, said packet filter module emulating a virtual packet filtering machine inspecting said data packets passing into and out of said computer network;

b) said packet filter module reading and executing said packet filter language instructions for performing packet filtering operations;

c) storing the results obtained in said step of reading and executing said packet filter language instructions in a storage device; and d) said packet filter module utilizing said stored results, from previous inspections, for operating said packet filter module to accept or reject the passage of said data packet into and out of said computer network.

9. The method according to claim 8 wherein said aspects include network objects.

10. The method according to claim 8 wherein said aspects include network services.

11. The method according to claim 9 wherein said aspects include network services.

12. The method according to claim 11 wherein said object definitions include the address of said object.

* * * * *